United States Patent
Jurek et al.

(10) Patent No.: US 9,150,742 B2
(45) Date of Patent: Oct. 6, 2015

(54) LINEAR POLYESTER RESINS AND IMPROVED LITHOGRAPHIC INKS

(75) Inventors: Michael J. Jurek, Oak Ridge, NJ (US); Joseph Malanga, Clark, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 14/241,134

(22) PCT Filed: Aug. 30, 2012

(86) PCT No.: PCT/US2012/053087
§ 371 (c)(1),
(2), (4) Date: Apr. 22, 2014

(87) PCT Pub. No.: WO2013/033360
PCT Pub. Date: Mar. 7, 2013

(65) Prior Publication Data
US 2014/0228471 A1   Aug. 14, 2014

Related U.S. Application Data

(60) Provisional application No. 61/530,536, filed on Sep. 2, 2011.

(51) Int. Cl.
C08F 2/46 (2006.01)
C08G 61/04 (2006.01)
C09D 11/104 (2014.01)
C08G 63/181 (2006.01)
C08G 63/42 (2006.01)
C08G 63/672 (2006.01)
C09D 11/101 (2014.01)

(52) U.S. Cl.
CPC ............ *C09D 11/104* (2013.01); *C08G 63/181* (2013.01); *C08G 63/42* (2013.01); *C08G 63/672* (2013.01); *C09D 11/101* (2013.01)

(58) Field of Classification Search
CPC .... C09D 11/00; C09D 167/00; C09D 11/104; C08G 63/42; C08G 63/78; C08G 63/181; C08G 63/672; C08G 64/00; C08L 67/02; C08L 67/00
USPC .................................. 522/170, 168, 1; 520/1
See application file for complete search history.

(56) References Cited

U.S. PATENT DOCUMENTS 3,629,362 A * 12/1971 Carlston ................... 525/111
5,780,582 A    7/1998 Wang et al.
6,074,758 A * 6/2000 Barbee ...................... 428/480

FOREIGN PATENT DOCUMENTS

| CN | 1245508 | | 2/2000 |
| WO | WO 2008/009987 | | 1/2008 |
| WO | 2011/091411 | * | 7/2011 |
| WO | 2011091411 A2 | | 7/2011 |

OTHER PUBLICATIONS

International Search Report mailed Jun. 26, 2013 in connection with International Application No. PCT/US2012/053087.
Chinese Office Action for Chinese Application No. 201280046480.4 dated Jan. 20, 2015.

* cited by examiner

*Primary Examiner* — Ling Choi
*Assistant Examiner* — Jessica E Whiteley
(74) *Attorney, Agent, or Firm* — Charles C. Achkar; Ostrolenk Faber LLP (57) ABSTRACT

The present invention describes a linear polyester resin comprising a di-epoxide monomer and a di-acid monomer useful in energy curable lithographic inks. The linear polyester resin exhibits a number average molecular weight less than 20,000. The present invention also describes an energy curable lithographic ink formulation including the linear polyester resin. The ink exhibits improved print density, print contrast, water window and rheological (total body) characteristics.

33 Claims, 3 Drawing Sheets

LINEAR POLYESTER RESINS AND IMPROVED LITHOGRAPHIC INKS

This application is a §371 National Phase application based on PCT/US2012/053087 filed on Aug. 30, 2012, which claims the benefit of U.S. Provisional Patent Application No. 61/530,536 filed Sep. 2, 2011, each of which hereby is incorporated by reference for all purposes as if fully set forth herein.

BACKGROUND OF THE INVENTION

1. Field of the Invention

Generally, the present invention is directed to novel, linear polyester resins. The present invention also is directed to energy curable lithographic inks and coatings including the novel, linear polyester resins. The present invention is further directed to articles of manufacture printed with lithographic inks or coatings.

2. Description of the Related Art

Energy curable lithographic inks have been used for many years in printing and graphic art technologies. The commercial appeal of using energy curable lithographic inks stems from its improved physical and chemical resistance properties post-cure. For example, in commercial application when lithographic images are printed and cured on substrates such as cartons or cardboard problems associated with ink scratching and flaking can be reduced and/or eliminated during downstream substrate folding processes.

Considerable resources have been spent by ink manufacturers to improve the overall characteristics of energy curable lithographic inks. Properties including but not limited to dot gain, water window and misting are of particular importance to lithographic inks. Dot gain commonly is defined as the mechanical increase in half tone dot size which occurs as the image is transferred from the plate to the blanket of a printing device, and ultimately transferred onto paper. Larger dot gain values, e.g., unintended spreading, may result in poor image quality. Water window commonly is defined as an ink's tolerance of water or fountain solution. Wide water window values are indicative of an ink's ability to sustain high print density. Alternatively, narrow water window values are indicative of low print density. Low print density inks cause toning, piling, scumming, and excessive dot gain.

Misting is another problem associated with lithographic inks. Misting is defined as the expulsion of small ink droplets from printing nips due to high printing speeds and low ink structure. Misting poses health and clean-up problems contrary to good manufacturing practices (GMPs). Namely, ink droplets form aerosol which ultimately migrates onto printing equipment or other sensitive areas in a print room. In addition, ink droplets in the form of aerosol may unintentionally be inhaled by employees causing unforeseen health concerns.

Regarding energy curable lithographic ink formulations, monomers or oligomers such as epoxy acrylates and polyester acrylates have been employed for improving certain print characteristics. For example, Bisphenol-A epoxy acrylates and their analogues, have been used in low performance inks to improve tack and misting. Tack is defined as the measured separation force in an ink film required for proper transfer and printing onto a substrate. For high performance inks, polyester acrylates and their analogues are most often employed becomes of their lower viscosities and higher functionalities. While acrylate monomers or oligomers are useful in reducing misting, they have proven ineffective in obtaining wide water windows, e.g., low water or fountain solution tolerance. This is attributed to their reactivity which poses stability concerns for ink formulations based on their polarity and solubility profiles.

To control misting and dot gain, gelled or structured varnishes (resins) have been employed in energy curable lithographic inks. Gelled varnishes are produced from resins reacted with chelating agents such as aluminum alkoxides and include coordinated covalent and hydrogen bonds. However, gelled resins are often incompatible with reactive acrylate-based monomers and oligomers. Namely, the polar properties of acrylates cause a breakdown of hydrogen bonding structures in gelled varnishes. To compensate, the gelled varnishes typically are enhanced with very high levels of gellant. However, poor flow and transfer qualities arise in energy curable lithographic inks resulting in handling difficulties. The gellants may also cause poor ink printability attributed to low water emulsification properties.

According to the inventors, there is still a need in the art for a novel polyester resin which improves printing properties of energy curable lithographic ink formulations. There is also a need in the art for energy curable lithographic ink formulations exhibiting wide water window values, improved print contrast, improved print density, and improved rheology (body) characteristics.

SUMMARY OF THE INVENTION

It has surprisingly been found by the inventors of the present invention that their novel, linear polyester resins improve energy curable lithographic ink and coating printing characteristics. Specifically, the energy curable lithographic ink formulations of the present invention include linear polyester resins designed to provide structure through cross-linking and entanglements. By so doing, the lithographic ink formulation exhibits improved rheology characteristics, wider water window values, and overall improved print characteristics.

According to one aspect of the invention, there is described a linear polyester resin including the reaction product of a di-epoxide monomer and a di-acid monomer wherein the polyester resin has a molecular weight less than 20,000. The polyester resin has a molar excess of either a di-epoxide monomer or a di-acid monomer. In one exemplary embodiment, the polyester resin includes a stoichiometric ratio of di-epoxide monomer to di-acid monomer ranging from about 0.30:0.99. In an alternative, exemplary embodiment, the polyester resin includes a stoichiometric ratio of di-acid monomer to di-epoxide monomer ranging from about 0.30:0.99.

According to another aspect of the invention, there is described a method for synthesizing the polyester resin. In an exemplary embodiment, a reaction between the di-epoxide monomer and di-acid monomer occurs in a solvent. In an exemplary embodiment, the solvent is a polymerizable monomer. Examples of polymerizable monomers include but are not limited to TMPTA, DiTMPTA, EoTMPTA, PETA, DiPETA, GPTA, TPDDA, SR-CN120 an CN 131-B and mixtures thereof.

According to yet another aspect of the invention, there is described a lithographic printing ink including the above-mentioned linear polyester resin. In an exemplary embodiment, the lithographic printing ink includes less than about 35 wt. of the linear polyester resin.

A further aspect of the present invention describes a printed article including the above-mentioned energy curable lithographic printing ink.

Additional features and advantages of the present invention will be set forth in the description which follows, and in part will be apparent from the description, or may be learned by practice of the invention. The advantages of the invention will be realized and attained by the structure particularly pointed out in the written description and claims hereof as well as the appended drawings.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention.
In the Drawings.

DETAILED DESCRIPTION OF THE INVENTION

Reference will now be made in detail to the embodiments of the present invention, and examples of which are illustrated in the accompanying figure(s).

While the description at times may refer to either inks or coatings, the present application is intended to support both inks and coatings. In addition, the term "polymerizable" is synonymous with the phrase "radiation curable" and will be used interchangeably throughout the specification unless expressly noted otherwise.

As used herein, the term "monomer" means a relatively low molecular weight material, i.e., having a molecular weight less than about 500 g/mole, having one or more polymerizable groups. "Oligomer" means a relatively intermediate molecular weight material having a molecular weight of from about 500 up to about 10,000 g/mole. "Polymer" means a relatively high molecular weight material having a molecular weight of at least about 10,000 g/mole, preferably at 10,000 to 100,000 g/mole. The term "molecular weight" as used throughout this specification means number average molecular weight unless expressly noted otherwise.

The inventors have surprisingly discovered a novel, linear polyester resin. These linear polyester resins are capable of being emulsified in water and therefore may be employed in energy curable lithographic printing inks and coatings. That is, the polyester resins can have water added to it without dramatically altering the resin's appearance and characteristics.

According to a first aspect of the present invention, the linear polyester resin is characterized as having reactive epoxy end-groups. For purposes of the present invention, reactivity of the end-groups is based upon the "polar" and "non-polar" properties characterized as the degree of charge polarization or dipole moment associated with a material. Polarity differences need only be relative, not absolute.

The linear polyester resin is configured such that it has a defined structure through cross-linking and entanglements. Conventional linear polyesters generally have 2 hydroxyl groups per polymer chain. By contrast, in an exemplary embodiment of the inventive, linear polyester resins have two pendant hydroxyl groups per repeat unit of the polyester (50 per polymer chain if 25 repeating units).

In another exemplary embodiment, the linear polyester resin has a number average molecular weight less than about 20,000. The molecular weights of the linear polyester resins described in the present invention are analyzed using solution Gel Permeation Chromatography (GPC) in a suitable solvent using a Waters 515 HPLC Pump equipped with a Waters 2410 refractive index detector or equivalent with Waters Millennium chromatography software, version 3.0, or equivalent with a Phenogel GPC 5 column set 300×7.8 mm OD, 5 mm particle size (Phenomenex) and pore sizes of 50 Å, 100 Å, 500 Å, 103 Å and 104 Å.

Chapter 2, section 6 of the book, *Principles of Polymerization*, 3rd Edition, written by George Odian explains controlling molecular weight in linear polymerizations. Namely, the adjustment of concentration of two monomers so they are slightly non-stoichiometric allows for the reaction to proceed to completion. In the reaction, one reactant is consumed and the polymer chains all possess the same end functional groups. Further polymerization does not occur and the polymer is stable to subsequent molecular weight changes.

According to the present invention, the chemical make-up of the linear polyester resin was tested using pyrolysis gas chromatography for purposes of confirming that no side reactions with solvent result in a branched polymer system. In this test, the sample is rapidly heated to begin a controlled decomposition. The breakdown patterns of the molecules were used to determine the structure of the starting material. Samples were prepared in passivated stainless steel cups and pyrolyzed in a Frontier Double-Shot Pyrolyzer PY-2020iD under helium carrier gas at indicated temperatures. Some samples were hydrolyzed and methylated in situ using tetramethylammonium hydroxide added to the cup. Pyrolysis products were separated on a capillary column in an Agilent 7890A Gas Chromato graph. Products were identified using an Agilent 5975C Mass Selective Detector with an EI source. Some of the conditions for the pyrolysis GC-MS are as follows:

Condition 1: 10 L of sample @ 600° C.;
Condition 2: 10 of sample+2 µL, TMAH @ 400° C.; and
Condition 3: 10 of sample+2 µL, TMAH @ 250° C.

Figure 1:
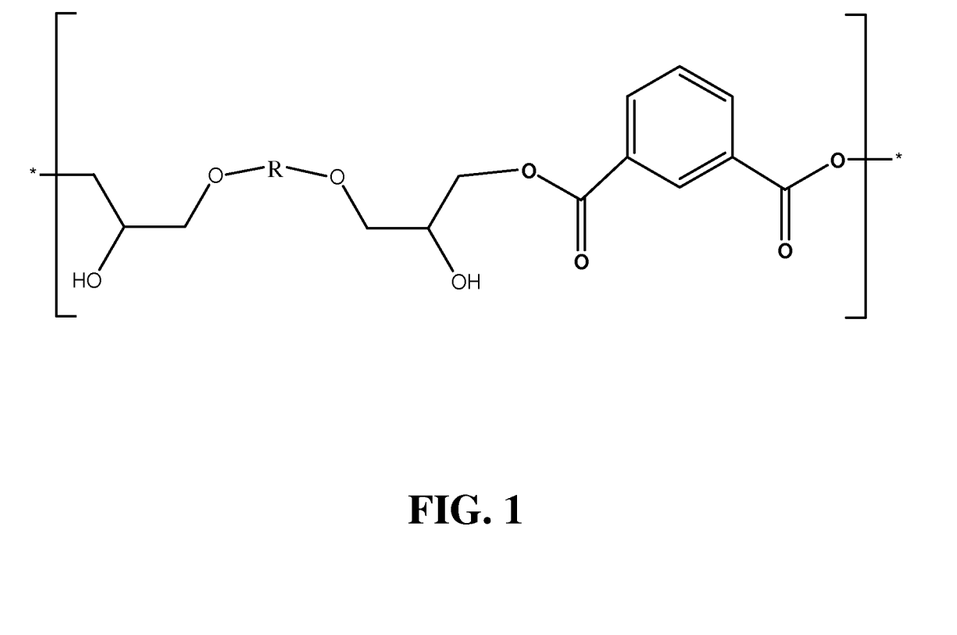
FIG. 1 illustrates a linear polyester resin according to the present invention.
Figure 2:
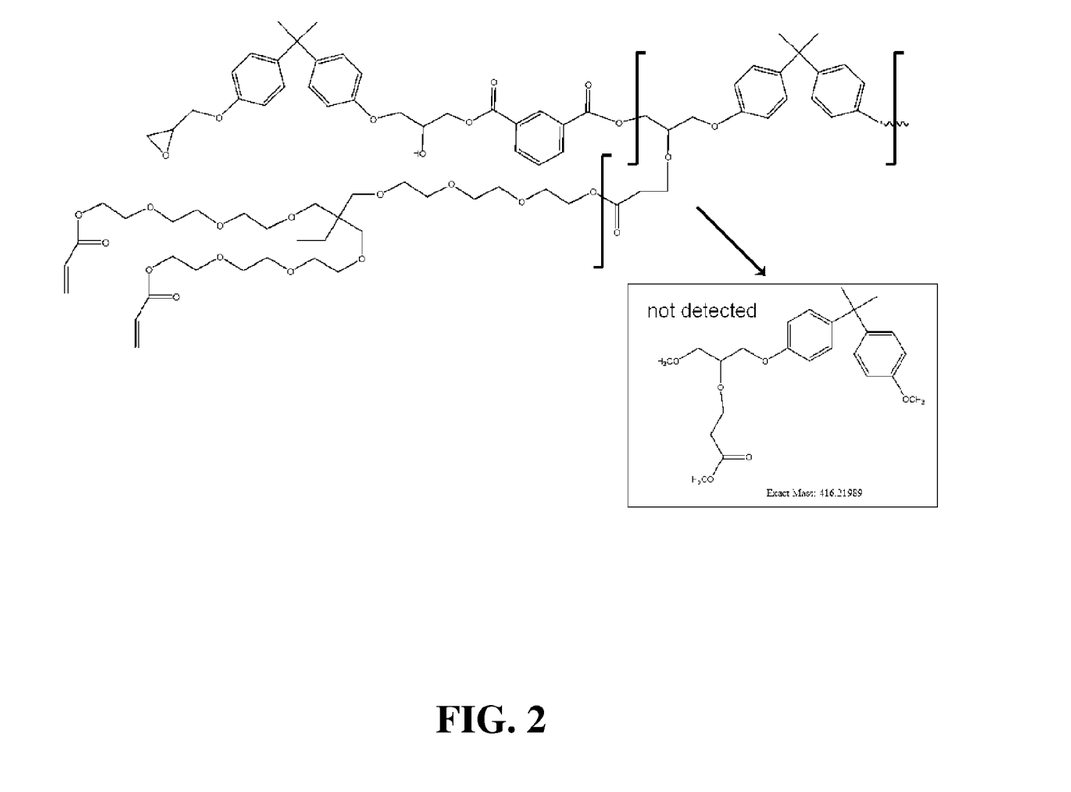
FIG. 2 illustrates a hypothetical branched polymer structure.
Figure 3:
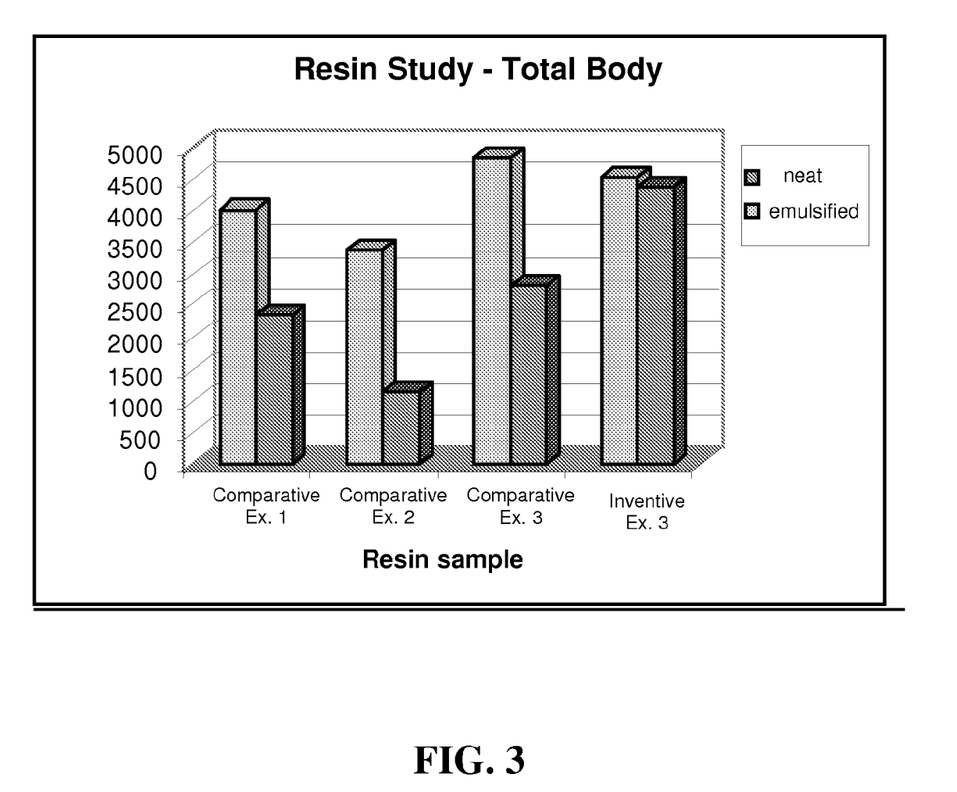
FIG. 3 illustrates the total body of neat and emulsified polyester resins.

Major pyrolysis products were all consistent with the linear structure shown in FIG. 1 where R is a bisphenol-A unit. For purposes of showing that the acrylate solvent does not react with the polyester resin, the structure of a hypothetical branched molecule as shown in FIG. 2 was used to identify characteristic breakdown molecules. There were no identified m/e species that matched the decomposition pattern of a branched molecule. Specifically, an expected pyrolysis product from the proposed structure would have been m/z 416. This product was not detected. Based on the results, there was no evidence of acrylic decomposition products confirming the absence of a reaction between the acrylate solvent and the inventive polyester resin.

According to another aspect of the present invention, there is described a method of synthesizing the polyester resin. For example, the polyester resin can be made in a solvent, distilled off and then replaced with a radiation curable monomer. Examples of solvents include but are not limited to water, hydrocarbon solvents, alcohols, glycols, esters and mixtures thereof. In an exemplary embodiment, the solvents include THF, 1, 4 dioxane, 2,2,4-irimethyl-1,3-pentanediol diisobutyrate (Eastman Txib) and mixtures thereof. Step-growth polymerization polymers produced in this manner can routinely be controlled from a few thousand to 25,000 number average molecular weight. In another, exemplary embodiment, the polyester resin is directly synthesized in a radiation curable monomer. According to the invention, it is preferable to have a lower molecular weight polyester resin to maximize the amount of polyester resin that can be added to an ink formulation.

Radiation curable monomers are exemplary, preferred solvents used for synthesizing the inventive polyester resin. As explained above, the radiation curable monomers are not a component of the polyester resin as verified by the decomposition products.

In a preferred embodiment, the radiation curable monomers may be monofunctional or multifunctional monomer. Examples of monofunctional monomers include but are not limited to (meth)acrylates. The term "(meth)acryl", as used herein, encompasses both acryl and/or methacryl. (Meth) acrylates include but are not limited to hexyl(meth)acrylate, 2-ethyl hexyl(meth)acrylate, tert-octyl(meth)acrylate, isoamyl(meth)acrylate, decyl(meth)acrylate, isodecyl(meth) acrylate, stearyl(meth)acrylate, isostearyl(meth)acrylate, cyclohexyl(meth)acrylate, 4-n-butyl cyclohexyl(meth)acrylate, bornyl(meth)acrylate, isobornyl(meth)acrylate, benzyl (meth)acrylate, 2-ethyl hexyl diglycol(meth)acrylate, butoxy ethyl(meth)acrylate, 2-chloroethyl(meth)acrylate, 4-bromobutyl(meth)acrylate, cyanoethyl(meth)acrylate, buthoxymethyl(meth)acrylate, 3-methoxy butyl(meth)acrylate, alkoxymethyl(meth)acrylate, alkoxyethyl(meth)acrylate, 2-(2-methoxy ethoxy)ethyl(meth)acrylate, 2-(2-butoxy ethoxy)ethyl(meth)acrylate, 2,2,2-trifluoroethyl(meth)acrylate, 1H,1H,2H,2H-perfluorodecyl(meth)acrylate, 4-butylphenyl(meth)acrylate, phenyl(meth)acrylate, 1,2,4,5-tetramethylphenyl(meth)acrylate, 4-chlorophenyl(meth) acrylate, phenoxymethyl(meth)acrylate, phenoxyethyl (meth)acrylate, glycidyl(meth)acrylate, glycidyloxybutyl (meth)acrylate, glycidyloxyethyl(meth)acrylate, glycidyloxypropyl(meth)acrylate, tetrahydrofuryl(meth) acrylate, hydroxyalkyl(meth)acrylate, 2-hydroxyethyl(meth) acrylate, 3-hydroxypropyl(meth)acrylate, 2-hydroxypropyl (meth)acrylate, 2-hydroxybutyl(meth)acrylate, 4-hydroxybutyl(meth)acrylate, dimethylaminoethyl(meth) acrylate, diethylaminoethyl(meth)acrylate, dimethylaminopropyl(meth)acrylate, diethylaminopropyl(meth)acrylate, trimethoxysilylpropyl(meth)acrylate, trimethylsilylpropyl (meth)acrylate, polyethylene oxide monomethyl ether(meth) acrylate, oligoethyleneoxid monomethylether(meth)acrylate, polyethylene oxide(meth)acrylate, oligoethyleneoxid (meth)acrylate, oligoethyleneoxid monoalkylether(meth) acrylate, polyethylene oxide monoalkyl ether(meth)acrylate, dipropyleneglycol(meth)acrylate, polypropylene oxide monoalkyl ether(meth)acrylate, oligopropylene oxide monoalkyl ether(meth)acrylate, 2-methacryloxyethyl succinic acid, 2-methacryloxy hexahydrophthalic acid, 2-methacryloxy eth-2-hydroxypropyl phthalate, butoxy diethylene glycol(meth)acrylate, trifluoroethyl(meth)acrylate, perfluorooctylethyl(meth)acrylate, 2-hydroxy-3-phenoxypropyl (meth)acrylate, ethylene oxide denatured phenol(meth)acrylate, ethylene oxide denatured cresol(meth)acrylate, ethylene oxide denatured nonylphenol(meth)acrylate, propylene oxide denatured nonylphenol(meth)acrylate, propylene oxide denatured 2-ethylhexyl(meth)acrylate, and mixtures thereof.

Further examples of mono-functional monomers such as (meth)acrylates include but are not limited to (meth)acrylic amide, N-methyl(meth)acrylic amide, N-ethyl(meth)acrylic amide, N-propyl(meth)acrylic amide, N-n-butyl(meth) acrylic amide, N-t-butyl(meth)acrylic amide, N-butoxymethyl(meth)acrylic amide, N-isopropyl(meth)acrylic amide, N-methylol(meth)acrylic amide, N,N-dimethyl(meth)acrylic amide, N,N-diethyl(meth)acrylic amide, N-morpholino (meth)acrylic amide and mixtures thereof.

Examples of di-functional monomers include but are not limited to tripropylene glycol di(meth)acrylate, triethylene glycol di(meth)acrylate, tetraethylene glycol di(meth)acrylate, polypropylene glycol di(meth)acrylate, neopentylglycol hydroxypivalic acid ester di(meth)acrylate (MANDA), hydroxypivalic acid neo-pentyl glycol ester di(meth)acrylate (HPNDA), 1,3-butanediol di(meth)acrylate (BGDA), 1,4-butanediol di(meth)acrylate (BUDA), 1,6-hexanediol di(meth) acrylate (HDDA), 1,9-nonanediol di(meth)acrylate, diethylene glycol di(meth)acrylate (DEGDA), neopentyl glycol di(meth)acrylate (NPGDA), tripropylene glycol di(meth) acrylate (TPGDA), neo-pentyl glycol ester di(meth)acrylate, propoxy neopentylglycol di(meth)acrylate, ethoxy denatured bisphenol A di(meth)acrylate, polyethylene glycol 200 di(meth)acrylate, polyethylene glycol 400 di(meth)acrylate and mixtures thereof.

Examples of multifunctional compounds greater than 2 include but are not limited to trimethylolpropane tri(meth) acrylate (TMPTA), pentaerythritol tri(meth)acrylate (PETA), dipentaerythritol hexa(meth)acrylate (DPHA), triallylisocyanate, (meth)acrylate of e-caprolactone denatured dipentaerythritol, tris(2-hydroxyethyl) isocyanurate tri(meth)acrylate, ethoxy trimethylolpropane tri(meth)acrylate, propoxy trimethylolpropane tri(meth)acrylate, propoxy glyceryl tri (meth)acrylate, pentaerythritol tetra(meth)acrylate, di(trimethylolpropane)tetra(meth)acrylate, dipentaerythritol hydroxypenta(meth)acrylate, ethoxy pentaerythritol tetra (meth)acrylate, penta(meth)acrylate ethoxy ester and mixtures thereof.

In yet another exemplary embodiment, the synthesis of the inventive polyester resin may include free radical inhibitors. Examples of free radical inhibitors useful for synthesis include but are not limited to substituted phenol compounds such as hydroquinone, methyl hydroquinone (THQ), monomethyl ether of hydroquinone (MEHQ), tert-butyl hydroquinone, di-tert-butyl hydroquinone, 2,6-di-tert-butyl-4-methylphenol (BHT), phenothiazine (PTZ), and any mixtures thereof.

Synthesis of the polyester resin may also include a reaction promoter, i.e., catalyst. Examples include but are not limited to triphenyl phosphine (TPP), tributylphosphine, diethyl carboxylate and mixtures thereof.

According to another aspect of the present invention, there is described a lithographic energy curable ink. The lithographic, energy curable inks include the above-mentioned linear polyesters. The inks exhibit improved printing and commercial advantages as described in more detail below. For example, the inks reduce misting in printing environments. In addition, the inks exhibit a wide water window properties which improve print contrast and print density. Further, the inks exhibit reduced total body change between neat and emulsified inks. The invention also encompasses a method of making the energy curable lithographic inks. The method includes incorporating the linear polyester resin in a solvent.

According to yet another aspect of the present invention, there is described an article upon which the energy curable lithographic inks according to the present invention are printed upon. In one example, the substrates include but are not limited to cardboard, paper, and various plastics, such as polypropylene and PET.

Polyester Resin

Reference will now be made to the linear polyester resin. In an exemplary embodiment, the linear polyester resin includes a di-epoxide monomer. The di-epoxide monomer can be selected from the group of diepoxide monomers, cycloaliphatic epoxies, cycloaromatic epoxies, and mixtures thereof.

Examples of di-epoxide monomers include but are not limited to bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolak resin, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexanecarboxylate, epoxycyclohexyl-5,5-spiro-3,4epoxy)cyclohexane-metha-dioxane, bis(3,4epoxy-cyciohexyimethyl)adipate, bis(3,4-epoxy-6-methylcyclohexylmethyl) adipate, 3,4-epoxy-6-methylcyclohexyl-3',4'epoxy-6'-methylcyclohexane carboxylate, methylenebis(3,4epoxycyclohexane), dicylopentadiene diepoxide, ethylene glycol di(3,4-epoxycyclohexylmethyl)ether, ethylenebis(3,4-epoxycyelohexane carboxylate), di-2-ethylhexyl epoxyhexahydrophthalate, 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ethers, 1,1,3-tetradecadiene dioxide, limonene dioxide, 1,2,7,8-diepoxyoctane, and 1,2,5,6-diepoxycyclooctane, and mixtures thereof, In a preferred embodiment, the di-epoxide monomers are selected from bisphenol-A diglycidyl ether (or ethoxylated analogues), or cycloaliphatic(aromatic) epoxies, hydrogenated bisphenol-A diglycidyl ether (or its ethoxylated analogues), and mixtures thereof.

In another exemplary embodiment, the polyester resin includes a di-acid monomer. In one exemplary embodiment, the di-acid monomer is organic. The organic di-acid may include but not limited to fumaric acid, malonic acid, itaconic acid, 2-methylitaconic acid, maleic acid, maleic anhydride, adipic acid, succinic acid, suberic acid, 2-ethyl succinic acid, glutaric acid, dodecylsuccinic acid, 2-methyladipic acid, pimelic acid, azelaic acid, sebacic acid, terephthalic acid, isophthalic acid, phthalic acid, 1,2-cyclohexanedioic acid, 1,3-cyclohexanedioic acid, 1,4-cyclohexanedioic acid, and alkyl esters. For alkyl ester, the alkyl optionally contains from about 2 to about 22 carbon atoms, and optionally includes esters of malonate, succinate, fumarate, itaconate, terephthalate, isophthalate, phthalate, cydohexanedioate, and mixtures thereof.

In another exemplary embodiment, the molecular weight of the polyester is controlled to produce a single phase system in a solvent such as a radiation curable monomer. For purposes of this application, the term single phase free means free of precipitates or non-dissolved solids based upon a visual observation. Commercially, this makes the polyester resin more attractive to potential customers because of the improvement in material handling. In turn, the energy curable lithographic ink is easier to formulate.

The stoichiometric ratio between reactive di-acid and di-epoxide monomers will determine the final polyester resin molecular weight. In one preferred embodiment, suitable stoichiometric ranges of the di-epoxide monomer to the di-acid monomer, or di-acid monomer to di-epoxide monomer, is about 1 to: 0.30-0.99; 0.30-0.95; 0.30-0.90; 0.30-0.85; 0.30-0.80; 0.30-0.75; 0.3-0.70; 0.30-0.65; 0.3-0.60; 0.3-0.55; 0.3-0.50; 0.3-0.45; 0.3-0.40; and 0.3-0.35.

In another exemplary embodiment, the stoichiometric range of the di-epoxide monomer to the di-acid monomer, or the di-acid monomer to the di-epoxide monomer is about 1: to: 0.4-0.99; 0.45-0.99; 0.5-0.99; 0.55-0.99; 0.60-0.99; 0.65-0.99; 0.70-0.99; 0.75-0.99; 0.80-0.99; 0.85-0.99; 0.90-0.99; and 0.95-0.99. In yet another preferred embodiment, the ratio of the of the di-epoxide monomer to the di-acid monomer, or the di-acid monomer to the di-epoxide monomer, is about 1 to: 0.42-0.65.

In yet another exemplary embodiment, the ratio of the di-epoxide monomer to the di-acid monomer, or the di-acid monomer to the di-epoxide monomer, is about 1 to: 0.01; 0.02; 0.03; 0.04; 0.05; 0.06; 0.07; 0.08; 0.09; 0.10; 0.11; 0.12; 0.13; 0.14; 0.15; 0.16; 0.17; 0.18; 0.19; 0.20; 0.21; 0.22; 0.23; 0.24; 0.25; 0.26; 0.27; 0.28; 029; 0.30; 0.31; 0.32; 0.33; 0.34; 0.35; 0.36; 0.37; 0.38; 0.39; 0.40; 0.41; 0.42; 0.43; 0.44; 0.45; 0.46; 0.47; 0.48; 0.49; 0.50; 0.51; 0.52; 0.53; 0.54; 0.55; 0.56; 0.57; 0.58; 0.59; 0.60; 0.61; 0.62; 0.63; 0.64; 0.65; 0.66; 0.67; 0.68; 0.69; 0.70; 0.71; 0.72; 0.73; 0.74; 0.75; 0.76; 0.77; 0.78; 0.79; 0.80; 0.81; 0.82; 0.83; 0.84; 0.85; 0.86; 0.87; 0.88; 0.89; 0.90; 0.91; 0.92; 0.93; 0.94; 0.95; 0.96; 0.97; 0.98; and 0.99.

While the invention broadly covers either monomer to be used in excess, the inventors point out that if low acid number polymers are desired, the di-acid monomer should be used in deficiency so it is consumed in the reaction. Low acid resins are often desirable in offset and lithographic printing. Low acid numbers signify that the reaction has almost gone to completion. High acid numbers signify the reaction is still proceeding. Polymers with high acid numbers tend to become over-emulsified with water from the fountain solution which results in poor print quality.

In another exemplary embodiment, the polyester resin is free of acrylates. The acrylates do not participate in the chemical reaction of the polyester resin. For example, the acrylates are polymerizable monomers. As discussed above, mass spectroscopy was performed to determine the chemical make-up of the inventive linear polyester resins. Specific tests were performed to ascertain the existence of acrylate-based additives. Based upon the tests conducted by the inventors, acrylates were not present in the synthesized polyester resin.

In an exemplary embodiment, a reaction promoter, i.e., catalyst, was employed in the reaction between a di-epoxide monomer and di-acid monomer. Examples include but are not limited to triphenyl phosphine (TPP), tributylphosphine, diethyl carboxylate and mixtures thereof.

In yet another exemplary embodiment, the average molecular weight of the polyester resin is about 1,000 to 20,000, more preferably about 2,000 to 15,000, even more preferably about 5,000 to 10,000 and most preferably about 6,000 to 8,000. In an exemplary embodiment, the molecular weight is about 1,000; 2,000; 3,000; 4,000; 5,000; 6,000; 7,000; 8,000; 9,000; 10,000; 11,000; 12,000; 13,000; 14,000; 15,000; 16,000; 17,000; 18,000; 19,000; and 20,000.

Ink

According to another aspect of the present invention, there is described an energy curable lithographic ink or coating. "Energy curable" defines the functionality directly or indirectly pendant from a surface-treated particle, monomer, oligomer, polymer, or other constituent that participates in polymerization and/or cross-linking reactions upon exposure to a suitable source of curing energy. Such functionality generally includes not only groups that cure via a cationic mechanism upon energy exposure but also groups that cure via a free radical mechanism.

The energy source used for achieving polymerization and/or cross-linking of the curable functionality may be actinic, e.g., radiation having a wavelength in the ultraviolet or visible region of the spectrum, accelerated particles, e.g., electron beam radiation, thermal, e.g., heat or infrared radiation, or the like. Preferably, the energy is actinic radiation or accelerated particles, because such energy provides excellent control over the initiation and rate of polymerization and/or cross-linking. Additionally, actinic radiation and accelerated particles can be used for curing at relatively low temperatures. This avoids degrading or evaporating components that might be sensitive to the relatively high temperatures that might be required to initiate polymerization and/or cross-linking of the energy curable groups when using thermal curing techniques. Suitable sources of curing energy include lasers, electron beams, mercury lamps, xenon lamps, carbon arc lamps, tungsten filament lamps, sunlight, low intensity ultraviolet light (black light), and the like. The use of black light for polymerization tends to form higher molecular weight polymers as compared to many other kinds of curing energy. Accordingly, when it is desired to form higher molecular weight materials upon curing, the use of black light is preferred.

The energy curable inks according to the present invention encompass both neat and emulsified inks. Neat inks are those which have not been emulsified with water. Emulsified inks typically have been emulsified with about 1 part water for every 10 parts ink. A discussion of neat and emulsified inks is provided in more detail in the examples section.

In an exemplary embodiment, the energy curable inks include a linear polyester resin. In one preferred embodiment, the polyester ranges from about 15 to 35 wt %; 20 to 35 wt %; and 25 to 35 wt %. In another preferred embodiment, the linear polyester ranges from about 15 to 30 wt %; 15 to 25 wt %, 15 to 20 wt %. In yet another exemplary embodiment, the linear polyester resin ranges from about 18 to 32 wt %; 20 to 30 wt %; 20 to 28 wt %; 20 to 25 wt %; and 20-23 wt %. According to the inventors, inks compositions including greater than about 35 wt. of the linear polyester resins discussed above exhibited poor printing characteristics subject to reduced print contrast and print density.

In an alternative, preferred embodiment, the energy curable lithographic ink includes a linear, polyester resin in an amount less than about 35 wt %; 34 wt %; 33 wt %; 32 wt %; 31 wt %; 30 wt %; 29 wt %; 28 wt %; 27 wt %; 26 wt %; 25 wt %; 24 wt %; 23 wt %; 22 wt %; 21 wt %; 20 wt %; 19 wt %; 18 wt %; 17 wt %; 16 wt %; 15 wt %; 14 wt %; 13 wt %; 12 wt %; 11 wt %; 10 wt %; 9 wt %; 8 wt %; 7 wt %; 6 wt %; 5 wt %; 4 wt %; 3; 2 wt %; and 1 wt %.

In another exemplary, embodiment, the energy curable lithographic ink contains a solvent. For example, the solvent can include but is not limited to water, hydrocarbon solvents, alcohols, glycols, esters, monofunctional or multifunctional acrylates, and mixtures thereof. In one example, the solvent may be a multifunctional monomer, such as the polymerizable monomer described above, in which the polyester resin directly is prepared. The monomers generally may be mono-, di-, tri-, tetra- or otherwise multifunctional in terms of energy curable moieties. These monomers function as diluents or solvents for the higher molecular weight constituent (s) (if any), as viscosity reducers, as binders when cured, and as cross-linking agents with respect to other energy curable materials. The amount of such monomers to be incorporated into the reactive fluid vehicle can vary within a wide range depending upon the intended use of the resultant composition.

in one embodiment, the polymerizable monomer is less than 50 wt %. Moreover, the polymerizable monomer ranges from about 15 to 35 wt %; 20 to 35 wt %; and 25 to 35 wt %. In another embodiment, the polyester ranges from about 1.5-25 wt %; and 20-25 wt %.

The polymerizable monomer may be present in the energy curable lithographic ink in an amount less than about 50 wt %; 49 wt %; 48 wt %; 47 wt %; 46 wt %; 45 wt %; 44 wt %; 43 wt %; 42 wt %; 41 wt %; 40 wt %; 39 wt %; 38 wt %; 37 wt %; 36 wt %; 35 wt %; 34 wt %; 33 wt %; 32 wt %; 31 wt %; 30 wt %; 29 wt %; 28 wt %; 27 wt %; 26 wt %; 25 wt %; 24 wt %; 23 wt %; 22 wt %; 21 wt %; 20 wt %; 19 wt %; 18 wt %; 17 wt %; 16 wt %; 15 wt %; 14 wt %; 13 wt %; 12 wt %; 11 wt %; 10 wt %; 9 wt %; 8 wt %; 7 wt %; 6 wt %; 5 wt %; 4 wt %; 3 wt %; 2 wt %; and 1 wt %.

In another exemplary embodiment, the energy curable lithographic ink may also contain a binder resin such as an aldehyde binder resin. Since the bulk of radiation curable ink and coating compositions are typically formulated with low molecular weight and low viscosity acrylic monomers, binder resins (preferably polymeric binder resins), are generally incorporated into the formulation. In addition to providing general film forming and resistance properties, the binder resins are used to raise the viscosity and body such that the composition is useful as a printing ink. These binder resins should be compatible with the other materials in the ink formulation and produce a higher viscosity ink for better handling when used in a printing press.

While the invention is not limited to any specific binder resin, an aldehyde resin is used in an exemplary embodiment. Other general classes of binder resins that could be used in the radiation curable lithographic inks of the present application include but are not limited to rosin esters, phenol modified rosin esters, maleic modified rosin esters, polyesters, polyacrylate resins, ketonic resins and hydrocarbon resins, among others known to those skilled in the art.

In one preferred embodiment, the binder resin ranges from about 5 to 35 wt %; 10 to 35 wt %; 15 to 35 wt %; and 20 to 35 wt %; 25 to 35 wt %. In another embodiment, the polyester ranges from about 10 to 20 wt %; 12-18 wt %; and 14-17 wt %.

In an alternative, preferred embodiment, the binder resin may be present in the energy curable lithographic ink in an amount less than about 35 wt %; 34 wt %; 33 wt %; 32 wt %; 31 wt %; 30 wt %; 29 wt %; 28 wt %; 27 wt %; 26 wt %; 25 wt %; 24 wt %; 23 wt %; 22 wt %; 21 wt %; 20 wt %; 19 wt %; 18 wt %; 17 wt %; 16 wt %; 15 wt %; 14 wt %; 13 wt %; 12 wt %; 11 wt %; 10 wt %; 9 wt %; 8 wt %; 7 wt %; 6 wt %; 5 wt %; 4 wt %; 3; 2 wt %; and 1 wt %.

According to another exemplary embodiment of the present invention, the energy curable lithographic inks contains radiation curable oligomers and/or polymers. These oligomers and/or polymers include but are not limited to (meth) acrylated urethanes, e.g., urethane(meth)acrylates), (meth) acrylated epoxies, e.g., epoxy(meth)acrylates), (meth) acrylated polyesters, e.g., polyester(meth)acrylates), (meth) acrylated(meth)acrylics, (meth)acrylated silicones, (meth) acrylated polyethers, e.g., polyether(meth)acrylates), vinyl (meth)acrylates, and (meth)acrylated oils.

Preferred (meth)acrylated aliphatic urethanes include, for example, di(meth)acrylate esters of hydroxyl terminated NCO extended aliphatic polyesters or aliphatic polyethers. (Meth)acrylated polyesters are the reaction products of (meth)acrylic acid with an aliphatic dibasic acid/aliphatic diol-based polyester. Examples of commercially available (meth)acrylated urethanes and polyesters include those known by the trade designations PHOTOMER (Henkel Corp. of Hoboken, N.J.); EBECRYL 284, 810, 4830, 8402, 1290, 1657, 1810, 2001, 2047, 230, 244, 264, 265, 270, 4833, 4835, 4842, 4866, 4883, 657, 770, 745, 754, 767, 1701, and 1755, 80, 81, 811, 812, 83, 830, 3700, 8301, 835, 870, 871, 8800, 8803, 8804 (UCB Radcure Inc. of Smyrna, Ga.); SARTOMER CN series CN964 B-85, CN292, CN704, CN816, CN817, CN818, CN929, CN944B85, CN945A-60, CN945B-85, CN953, CN961, CN962, CN963, CN 965, CN966, CN968, CN980, CN981, CN982, CN983, CN984, CN985 (Sartomer Co. of Exton, Pa.); ACTILANE (Akcross Chemicals of New Brunswick, N.J.); and UVITHANE (Morton International of Chicago, Ill.). ELVACITE 2014 (ICI Acrylics, Inc., Wilmington, Del.); JONCRYL 587 (S.C. Johnson, Racine, Wis.); and ACRYLOID B series and PARALOID B series such as PARALOID B-60 (Rohm & Haas Co., Philadelphia, Pa.).

The radiation curable oligomer and/or polymer may be present in the energy curable lithographic ink in an amount less than about 35 wt %; 34 wt %; 33 wt %; 32 wt %; 31 wt %; 30 wt %; 29 wt %; 28 wt %; 27 wt %; 26 wt %; 25 wt %; 24 wt %; 23 wt %; 22 wt %; 21 wt %; 20 wt %; 19 wt %; 18 wt %; 17 wt %; 16 wt %; 15 wt %; 14 wt %; 13 wt %; 12 wt %; 11 wt %; 10 wt %; 9 wt %; 8 wt %; 7 wt %; 6 wt %; 5 wt %; 4 wt %; 3 wt %; 2 wt %; and 1 wt %.

According to yet another preferred embodiment, the energy curable lithographic ink includes a photoinitiator. The photoinitiators induce a reaction such as cross-linking reaction or polymerization by irradiation with light to increase the molecular weight of the prepolymer. In such a case, when the photoinitiator may, for example, be a benzoine alkyl ether derivative, a benzophenone derivative, an a-aminoalkylphenone type, an oxime ester derivative, a thioxanthone derivative, an anthraquinone derivative, an acylphosphineox-50 ide derivative, a glyoxyester derivative, an organic peroxide type, a trihalomethyltriazine derivative, a titanocene derivative and mixtures thereof. Specifically, IRGACURE 651, IRGACURE 184, DAROCUR 1173, IRGACURE 500, IRGACURE 2959, 55 IRGACURE 754, IRGACURE 907, IRGACURE 369, IRGACURE 1300, IRGACURE 819, IRGACURE 819DW, IRGACURE 1880, IRGACURE 1870, DAROCUR TPO, DAROCUR 4265, IRGACURE 784, IRGACURE OXE01, IRGACURE OXE02 or IRGACURE 250 (manufactured by 60 Ciba Specialty Chemicals K.K.), KAYACURE DETX-S, KAYACURE CTX, KAYACURE BMS or KAYACURE 2-EAQ (manufactured by Nippon Kayaku Co., Ltd.), TAZ101, TAZ-102, TAZ-103, TAZ-104, TAZ-106, TAZ-107, TAZ-108, TAZ-110, TAZ-113, TAZ-114, TAZ-118, TAZ-65 122, TAZ-123, TAZ-140 or TAZ-204 (manufactured by Midori Kagaku Co., Ltd.).

The photoinitiator may be used alone or in combination as a mixture of two or more photoinitiators. A high sensitive initiator is desired since it is possible to carry out curing by a low irradiation energy. Examples include but are not limited to IRGACURE 907 (alpha-aminoalkylphenone type), IRGACURE 369 (alpha-aminoalkylphenone type), DAROCUR TPO (acylphosphineoxide type), IRGACURE OXE01 (oxime ester derivative) or IRGACURE OXE02 (oxime ester derivative) is preferred, and DAROCUR TPO, IRGACURE OXE01, IRG ACURE OXE02 and mixtures thereof.

The photoinitiator may be present in the energy curable lithographic ink in an amount less than about 5 wt %; 4.5 wt %; 4 wt %; 3.5 wt %; 3.0 wt %; 2.5 wt %; 2 wt %; 1.5 wt %; 1 wt %; and 0.5 wt %.

The energy curable lithographic inks may also include a colorant. The colorant may be a pigment or a dye. The colorants may b organic or inorganic. The dyes include but are not limited to acid dyes, natural dyes, direct dyes (either cationic or anionic), basic dyes, reactive dyes and mixtures thereof.

The acid dyes, also regarded as anionic dyes, are soluble in water and mainly insoluble in organic solvents and are selected, from yellow acid dyes, orange acid dyes, red acid dyes, violet acid dyes, blue acid dyes, green acid dyes, and black acid dyes. For example, yellow acid dyes can be selected from Acid Yellow 1 International Color Index or C.I. 10316); Acid Yellow 7 (C.I. 56295); Acid Yellow 17 (C.I. 18965); Acid Yellow 23 (C.I. 19140); Acid Yellow 29 (C.I. 18900); Acid Yellow 36 (C.I. 13065); Acid Yellow 42 (C.I. 22910); Acid Yellow 73 (C.I. 45350); Acid Yellow 99 (C.I. 13908); Acid Yellow 194; and Food Yellow 3 (C.I. 15985). The orange acid dyes can be selected from Acid Orange 1 (C.I. 13090/1); Acid Orange 10 (C.I. 16230); Acid Orange 20 (C.I. 14603); Acid Orange 76 (C.I. 18870); Acid Orange 142; Food Orange 2 (C.I. 15980); and Orange B. The red acid dyes can be selected from Acid Red 1. (C.I. 18050); Acid Red 4 (C.I. 14710); Acid Red 18 (C.I. 16255), Acid Red 26 (C.I. 16150); Acid Red 2.7 (C.I. as Acid Red 51 (C.I. 45430, available from BASF Corporation, Mt. Olive, N.J.) Acid Red 52 (C.I. 45100); Acid Red 73 (C.I. 27290); Acid Red 87 (C.I. 45380); Acid Red 94 (C.I. 45440) Acid Red 194; and Food Red 1 (C.I. 14700). The violet acid dyes can be selected from Acid Violet 7 (C.I. 18055); and Acid Violet 49 (C.I. 42640). The blue acid dyes can be selected from include Acid Blue 1 (C.I. 42045); Acid Blue 9 (C.I. 42090); Acid Blue 22 (C.I. 42755); Acid Blue 74 (C.I. 73015); Acid Blue 93 (C.I. 42780); and Acid Blue 158A (C.I. 15050). The green acid dyes can be selected from Acid Green 1 (C.I. 10028); Acid Green 3 (C.I. 42085); Acid Green 5 (C.I. 42095); Acid Green 26 (C.I. 44025); and Food Green 3 (C.I. 42053). The black acid dyes can be selected from Acid Black 1 (C.I. 20470); Acid Black 194 (BASANTOL™ X80, available from BASF Corporation, an azo/1:2 CR-complex.

The direct dyes selected for use in the present invention include but are not limited to Direct Blue 86 (C.I. 74180); Direct Blue 199; Direct Black 168; Direct Red 253; and Direct Yellow 107/132 (C.I. Not Assigned), and mixtures thereof.

The natural dyes selected for use in the present invention include but are not limited to Alkanet (C.I. 75520,75530); Annafto (C.I. 75120); Carotene (C.I. 75130); Chestnut; Cochineal (C.I. 75470); Cutch (C.I. 75250, 75260); Divi-Divi; Fustic (C.I. 75240); Hypernic (C.I. 75280); Logwood (C.I. 75200); Osage Orange (C.I. 75660); Paprika; Quercitron (C.I. 75720); Sanrou (C.I. 75100); Sandal Wood (C.I. 75510, 75540, 75550, 75560); Sumac; and Tumeric (C.I. 75300).

The reactive dyes selected for use in the present invention include but are not limited to Reactive Yellow 37 (monoazo dye); Reactive Black 3.1 (disazo dye); Reactive Blue 77 (phthalo cyanine dye) and Reactive Red 180 and Reactive Red 108 dyes.

Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7.

The pigment is any organic pigment that can be employed for the coloration of conventional printing inks of the prior art.

The pigment may also be Pigment Black 7 (carbon black) or other inorganic pigments, such as Pigment White 6 (Titanium Dioxide), Pigment Black 11 (Black Iron Oxide), Pigment Red 101 (Red Iron Oxide) and Pigment Yellow 42 (Yellow Iron Oxide). Among those pigments suitable for use in the present invention are conventional organic pigments such as: Pigment Yellow 1, Pigment Yellow 3, Pigment Yellow 12, Pigment Yellow 13, Pigment Yellow 14, Pigment Yellow 17, Pigment Yellow 37, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 114, Pigment Yellow 121, Pigment 26 Yellow 126, Pigment Yellow 136, Pigment Yellow 174, Pigment Yellow 176, Pigment Yellow 188, Pigment Orange 5, Pigment Orange 13, Pigment Orange 16, Pigment Orange 34, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 112, Pigment Red 146, Pigment Red 170, Pigment Red 196, Pigment Red 210, Pigment Red 238, Pigment Blue 15, Pigment Blue 15:1, Pigment Blue 15:2, Pigment Blue 15:3, Pigment Blue 15:4, Pigment Green 7, Pigment Green 36, Pigment Violet 23, or carbon black, including Pigment Black 7 and the like.

Inorganic pigments may include but not limited to iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

The colorant may be present in the energy curable lithographic ink in an amount less than 25 wt %; 24 wt %; 23 wt %; 22 wt %; 21 wt %; 20 wt %; 19 wt %; 18 wt %; 17 wt %; 16 wt %; 15 wt %; 14 wt %; 13 wt %; 12 wt %; 11 wt %; 10 wt %; 9 wt %; 8 wt %; 7 wt %; 6 wt %; 5 wt %; 4 wt %; 3 wt %; 2 wt %; and 1 wt %.

According to another embodiment, the energy curable lithographic inks include a wax. The wax may include but is not limited to parrafinic wax, carnauba wax, mineral waxes, montan wax and its derivatives, petroleum wax, and synthetic waxes such as polyethylene and oxidized polyethylene waxes. In an exemplary embodiment, the wax may be present in the energy curable lithographic ink in an amount less than 12 wt %; 11 wt %; 10 wt %; 9 wt %; 8 wt %; 7 wt %; 6 wt %; 5 wt %; 4 wt %; 3 wt %; 2 wt %; 1 wt %.

Examples of the radical polymerization inhibitor include but are not limited to hydroquinone, benzoquinone, p-methoxyphenol or TEMPO. Without being restricted to these compounds, such inhibitors include compounds with quinone or hydroquinone units, in particular benzoquinone and substituted benzoquinones, hydroquinone and substitutedhydroquinones, such as 2,6-dimethylhydroquinone; ethers of hydroquinones, in particular of hydroquinones and substituted hydroquinones such as hydroquinone monomethylether (4-methoxphenol), t-butylhydroquinone (4-t-Butylphenol, TBHQ), and t-butylhydroxyanisol (BHA); resorcinol; pyrogallol; phosphite esters; and sterically hindered phenols and bisphenols, such as 2,6-di-t-butyl-4-methylphenol (BHT), 2,6-di-t-butyl-4methoxyphenol and 2,4,6-tri-t-butylphenol; stable free radicals such as di-t-butylnitroxide and 2,2,6,6-tetramethyl-4pyridonenitroxide; nitro-substituted aromatics; phenothiazine and secondary diarylamines, such as substituted diphenylamines, N,N'-diphenyl-p-phenylenediamine and N-phenylnaphthylamine. Quinones, hydroquinones, ethers of hydroquinones and sterically hindered phenols are preferred free radical inhibitors. More preferred are ethers of hydroquinones, in particular ethers of hydroquinone and sterically hindered phenols. Hydroquinone monomethylether (4-methoxphenol), 2,6-di-t-butyl-4-methylphenol and 2,4,6-tri-t-butylphenol are preferred compounds.

Inhibitors include but are not limited to substituted phenol compounds such as hydroquinone, methyl hydroquinone (THQ), monomethyl ether of hydroquinone (MEHQ), tert-butyl hydroquinone, di-tert-butyl hydroquinone, 2,6-di-tert-butyl-4-methylphenol (BHT), as well as phenothiazine (PTZ), and any mixtures thereof.

The total amount of inhibitor in the energy curable lithographic ink generally ranges from about 0 to 4 wt %, preferably from 1 to 3% by weight; and most preferably about 1.5 to 2.5 wt %.

A variety of functional cross-linkable film formers (sometimes referred to below as "film formers") can be employed in the invention. Representative film formers typically will be monomers or oligomers having vinyl functionality such as alkyl di-, tri-, tetra- and higher-functional acrylates and methacrylates, and monomers and oligomers having allyllic, fumaric or crotonic unsaturation and they are soft films prior to curing and become harder films upon cross-linking. Preferred film formers (and in some cases their glass transition temperature or "Tg" values) include, but are not limited to, stearyl acrylate (e.g., SR-257, Tg=about 35° C., commercially available from Sartomer Company), stearyl methacrylate (e.g., SR-324, Tg=about 38° C., commercially available from Sartomer Company), glycidyl methacrylate (e.g., SR-379, Tg=about 41° C., commercially available from Sartomer Company), 1,6-hexanediol diacrylate (e.g., SR-238, Tg=about 43° C., commercially available from Sartomer Company), urethane methacrylates (e.g., CN-1963, Tg=about 45° C., commercially available from Sartomer Company), 1,4-butanediol diacrylate (e.g., SR-213, Tg=about 45° C., commercially available from Sartomer Company), alkoxylated aliphatic diacrylates (e.g., SR-9209, Tg=about 48° C., commercially available from Sartomer Company), alkoxylated cyclohexane dimethanol diacrylates (e.g., CD-582, Tg=about 49° C., commercially available from Sartomer Company), ethoxylated bisphenol Adimethacrylates (e.g., CD-541, Tg=about 54° C., SR-601, Tg=about 60° C. and CD-450, Tg=about 108° C., all commercially available from Sartomer Company), 2-phenoxyethyl methacrylate (e.g., SR-340, Tg=about 54° C., commercially available from Sartomer Company), epoxy acrylates (e.g., CN-120, Tg=about 60° C., CN-124, Tg=about 64° C. and CN-104, Tg=about 67° C., all commercially available from Sartomer Company), tripropylene glycol diacrylate (e.g., SR-306, Tg=about 62° C., commercially available from Sartomer Company), trimethylolpropane triacrylate (e.g., SR-351, Tg=about 62° C., commercially available from Sartomer Company), diethylene glycol dimethacrylate (e.g., SR-231, Tg=about 66° C., commercially available from Sartomer Company), epoxy methacrylates. (e.g., CN-151, Tg=about 68° C., commercially available from Sartomer Company), triethylene glycol diacrylate (e.g., SR-272, Tg=about 70° C., commercially available from Sartomer Company), urethane acrylates (e.g., CN-968, Tg=about 84° C. and CN-983, Tg=about 90° C., both commercially available from Sartomer Company, PHOTOMER™ 6210, PHOTOMER 6010 and PHOTOMER 6230, all commercially available from Cognis Corporation, EBECRYL™ 8402, EBECRYL 8807 and EBECRYL 4883, all commercially available from UCB Radcure, and LAROMER™ LR 8739 and LAROMER LR 8987, both commercially available from BASF), dipentaerythritol pentaacrylates (e.g., SR-399, commercially available from Sartomer Company, Tg=about 90° C.), epoxy acrylates blended with styrene (e.g., CN-120S80, commercially available from Sartomer Company, Tg=about 95° C.), di-trimethylolpropane tetraacrylates (e.g., SR-355, commercially available from Sartomer Company, Tg=about 98° C.), diethylene glycol diacrylates (e.g., SR-230, commercially available from Sartomer Company, Tg=about 1000° C.), 1,3-butylene glycol diacrylate (e.g., SR-212, commercially available from Sartomer Company, Tg=about 101° C.), pentaacrylate esters (e.g., SR-9041, commercially available from Sartomer Company, Tg=about 102° C.), pentaerythritol tetraacrylates (e.g., SR-295, commercially available from Sartomer Company, Tg=about 103° C.), pentaerythritol triacrylates (e.g., SR-444, commercially available from Sartomer Company, Tg=about 103° C.), ethoxylated (3)trimethylolpropane triacrylates (e.g., SR-454, commercially available from Sartomer Company, Tg=about 103° C.), alkoxylated trifunctional acrylate esters (e.g., SR-9008, commercially available from Sartomer Company, Tg=about 103° C.), dipropylene glycol diacrylates (e.g., SR-508, commercially available from Sartomer Company, Tg=about 104° C.), neopentyl glycol diacrylates (e.g., SR-247, commercially available from Sartomer Company, Tg=about 107° C.), cyclohexane dimethanol diacrylate esters (e.g., CD-406, commercially available from Sartomer Company, Tg=about 110° C.), cyclic diacrylates (e.g., IRR-214, commercially available from UCB Chemicals, Tg=about 208° C.), polyester acrylates (e.g., CN 2200, Tg=about −20° C., and CN2256, both commercially available from Sartomer Company) and tris(2-hydroxy ethyl) isocyanurate triacrylate (e.g., SR-368, commercially available from Sartomer Company, Tg=about 272° C.), acrylates of the foregoing methacrylates and methacrylates of the foregoing acrylates. Hexanediol diacrylate, butanediol diacrylate, pentaerythritol triacrylate ("PETA"), pentaerythritol tetraacrylate, trimethylolpropane triacrylate ("TMPTA").

As additional components of compositions of the present invention, one or more other ingredients may be incorporated into compositions of the present invention in accordance with conventional practices. These optional additives include one or more additional solvents; gloss modifiers; slip modifiers; antifoaming agents; flow or other rheology control agents, oils; plasticizers; binders; antioxidants; stabilizers; fungicides; bactericides; organic and/or inorganic filler particles; leveling agents; opacifiers; antistatic agents; dispersants; and the like.

EXAMPLES

Provided below is a description of each of the inventive linear polyester resins according to the present invention with a molecular weight less than about 20,000.

Example A

Polyester—Dow DER 331, an epoxidized bisphenol-A monomer (266 g) and sebacic acid (82 g) were added to a 1-L resin kettle. GPTA (350 g) was added as the reaction solvent and MEHQ and BHT were added as free radical inhibitors 0.5-1 wt %. Triphenyl phosphine (TPP) (2 g) was added to promote the coupling reaction. The reaction was heated to 110-120° C. for 10 hours after which time the clear solution was filtered into a dark glass bottle. The acid number was <0.2.

Example B

Polyester—DER 331 (307 g) and sebacic acid (71 g) were added to a 1 L resin kettle with EoTMPTA (290 g) as the reaction solvent. BHT, MEHQ were added as free radical inhibitors 0.5-1 wt %. TPP was added as a reaction promoter 0.4%. The reaction was run at 95-100° C. for 12 hrs and then 12 g acrylic acid was added to functionalize the secondary alcohol groups resulting from the ring opening of the epoxide groups. The clear solution was filtered into a dark glass jar and has an acid number of 0.81.

Example C

Polyester—DER 331 (305 g) and isophthalic acid (59 g) were added to a 1 L resin kettle with EoTMPTA (310 g) as the reaction solvent. BHT, MEHQ were added as free radical inhibitors in an amount of 0.5-1 wt % and TPP was added as a reaction promoter 0.4%. The reaction was run at 100-115° C. for 9 hrs. The clear solution was filtered into a dark glass jar and has an acid number of 0.22.

Example D

Polyester—DER 331 (305 g) and isophthalic acid (59 g) were added to a 1 L resin kettle with TPGDA (305 g) as the reaction solvent. BHT, MEHQ were added as free radical inhibitors 0.5-1 wt %. TPP was added as a reaction promoter 0.4%. The reaction was run at 95-105° C. for 9 hrs. The clear solution was filtered into a dark glass jar and has an acid number of 0.44.

Example E

Polyester—DER 331 (152 g) and fumaric acid (47 g) were added to a 1 L resin kettle. GPTA (350 g) as the reaction solvent. BHT and MEHQ were added as free radical inhibitors 0.5-1 wt %. TPP was used as a reaction promoter 0.4%. The reaction was run at 110-120° C. for 12 hr to produce a clear polymer solution with an acid number of 0.45.

Example F

Polyester—Epotuf 37-140 (305 g) and isophthalic acid (59 g) were added to a 1 L resin kettle. Sartomer CN-131-B (310 g) was added as the reaction solvent. BHT and MEHQ were added as free-radical inhibitors 0.5-1 wt %. TPP was used as a reaction promoter 0.4% The reaction was run at 110-120° C. for 9 hr to produce a clear polymer solution with an acid number of 0.22.

Example G

Polyester—DER 331 (267 g) and sebacic acid (95 g) were added to a 1 L resin kettle with EoTMPTA (350 g) as the reaction solvent. BHT, MEHQ were added a free radical inhibitors 0.5-1 wt %. TPP was added as a reaction promoter 0.4% A monofunctional acid, nonanoic acid (37 g) was added to end-functionalize the polymer. The reaction was run at 95-115° C. for 12 hrs. The clear solution was filtered into a dark glass jar with an acid number of 1.

All of the Inventive polyester Examples A-G exhibited improved misting and/or rheological properties (total body change) when employed in energy curable lithographic inks and compared to conventional formulations. The results of the evaluation can be seen in Table 1 below. Namely, Examples A-G were used in the Inventive Ink Examples 1-7, respectively as illustrated in Table 1 below.

TABLE 1

| | Inventive Inks | | | | | | |
|---|---|---|---|---|---|---|---|
| | Inventive Ink 1 | Inventive Ink 2 | Inventive Ink 3 | Inventive Ink 4 | Inventive Ink 5 | Inventive Ink 6 | Inventive Ink 7 |
| Cyan Pigment 15:3 | 13 | 13 | 13 | 13 | 13 | 13 | 13 |

TABLE 1-continued

Inventive Inks

|  | Inventive Ink 1 | Inventive Ink 2 | Inventive Ink 3 | Inventive Ink 4 | Inventive Ink 5 | Inventive Ink 6 | Inventive Ink 7 |
|---|---|---|---|---|---|---|---|
| Ebecryl 657 | 15 | 15 | 15 | 15 | 15 | 15 | 15 |
| Ex. A Polyester | 22 | — | — | — | — | — | — |
| Ex. B Polyester | — | 22 | — | — | — | — | — |
| Ex. C Polyester | — | — | 22 | — | — | — | — |
| Ex. D Polyester | — | — | — | 22 | — | — | — |
| Ex. E Polyester | — | — | — | — | 22 | — | — |
| Ex. F Polyester | — | — | — | — | — | 22 | — |
| Ex. G Polyester | — | — | — | — | — | — | 22 |
| Aldehyde binder resin | 15 | 15 | 15 | 15 | 15 | 15 | 15 |
| Triacrylate monomer | 23 | 23 | 23 | 23 | 23 | 23 | 23 |
| Photoinitiator[2] | 2 | 2 | 2 | 2 | 2 | 2 | 2 |
| Paraffinic waxes | 8 | 8 | 8 | 8 | 8 | 8 | 8 |
| Hydroquinone Inhibitor | 2 | 2 | 2 | 2 | 2 | 2 | 2 |
| TOTAL | 100 | 100 | 100 | 100 | 100 | 100 | 100 |
| Grind (NPIRI) | 0/0/2 | 2/2/4 | 0/0/0 | 0/0/0 | 0/0/2 | 1/1/1 | 0/0/2 |
| Misting Test | 3 | 3 | 4 | 3 | 4 | 2 | 2 |
| Total Body (Neat) | 2905 | 4135 | 4520 | 2388 | 1693 | 3466 | 2058 |
| Total Body (Emulsified) | 2533 | 3586 | 4388 | 2524 | 1720 | 3418 | 1900 |
| % Total Body Change | 12.8% | 13.3% | 2.9% | −0.6% | −0.2% | 0.01% | 7.7% |

[2]Photoinitiators most suited for this type of radiation curable printing inks would be Norrish type 1 compounds and mixtures thereof used for pigmented coatings such as those marketed by Ciba as Irgacure 907, Irgacure 500, Darocure 4265 and mixtures thereof.

TABLE 2

Comparative Inks

|  | Comp. Ex. 1 (Screen formulation) | Comp. Ex. 2 (Screen formulation) | Comp. Ex. 3 (Screen formulation) | Comp. Ex. 4 Sunbeam Accel |
|---|---|---|---|---|
| Cyan Pigment 15:3 | 30 | 30 | 30 | 13 |
| Ebecryl 657 | 50 | — | — | 15 |
| Ebecryl 871 | — | 50 | — | — |
| Ebecryl 3700 | — | — | 50 | 22 |
| Aldehyde binder resin | — | — | — | 15 |
| Triacrylate monomer | — | — | — | 23 |
| Photoinitiator | — | — | — | 2 |
| Parrafinic wax | — | — | — | 8 |
| Inhibitors (hydroquinone type) | — | — | — | 2 |
| Ethoxylated TMPTA | 20 | 20 | 20 | — |
| Total | 100 | 100 | 100 | 100 |
| Grind (NPIRI-G1 grind gauge) | 0/0/0 | 0/0/0 | 0/0/0 | 0/0/0 |
| Misting Test | 3 | 2 | 2 | 3 |
| Total Body (Neat) | 4019 | 3378 | 4854 | 1402 |
| Total Body (Emulsified) | 2356 | 1146 | 2830 | 840 |
| % Total Body Change | 41.4% | 66.1% | 41.7% | 40.0% |

EXPERIMENTAL TESTS AND RESULTS

Based on the examples described above, the energy curable lithographic inks of the present invention exhibit superior lithographic performance. Specifically, inks exhibit a wide water window and superior lithographic press performance. The inks also offer rapid polymerization under UV or EB irradiation. Further, the inks of the present invention improve handling for establishing and maintaining operational press settings without continual modification during the press run.

It has been found by the inventors that certain lithographic press performance properties must be maintained by a UV/EB lithographic ink, in order to effectively print upon a substrate. These at least include wide water windows, low dot gain, high print density, and good print contrast. Low dot gain values are obtained by successive iterations performed by a press operator until the desired characteristics are exhibited.

The energy curable lithographic inks of the present invention exhibit improved resistance to piling, toning, scumming and picking. Piling is defined as the build up of ink on the offset blanket. Toning is defined as the contamination of the non-image area of the print with ink. Scumming is defined as the contamination of fountain solution with ink particles. Picking is defined as the pulling of tiny pieces of the paper substrate by an ink with too high of an amount of tack. The energy curable inks exhibit less picking on the rollers based upon the tack content. Thus, the inventive inks do not pile upon the offset blanket, avoid contamination of the non-image areas, and reduce or avoid contamination of fountain solutions.

In addition, the energy curable lithographic inks of the present invention exhibit improved ink mileage and low frequency for blanket washing. Ink mileage is defined as the number of prints that can be produced with the same amount of ink. The energy curable inks are capable of being emulsified in greater volumes of water. The frequency between the need for blanket washes is measured by the number of impressions between said required blanket washes, where the washes are required due to dried ink on the press blanket. The frequency of blanket washes optimally should be low while the number of impressions between blanket washes should be high. Hence, the inventive inks can be run for longer times on a printing press and require fewer blanket washes.

Misting

Ink tack and misting characteristics were measured on a Thwing Albert Model 101 electronic inkometer. Tack and misting were recorded for 1 minute at 1200 rpm and a temperature of 90° F. Misting was visually measured on an empirical scale of 1-5 with 5 representing no misting and 1 representing severe misting. The misting results for each of the inventive ink examples are exhibited in Table 1.

Rheology Criteria (Total Body)

In establishing the criteria of the rheological performance of the inks of the present invention, 10 parts of ink is emulsified with 1 part of water or any commercially available fountain solution on the proper mixing equipment. Both neat (non-emulsified) and emulsified inks are then subjected to a wide range of shear stress (flow experiment), typically from 0.01 to 10000 Pa using a rheometer. The geometry used to record viscosity profiles is not restricted in any way. The measurements were obtained using a cone-and-plate setting. As indicated above, the viscosity ratio between emulsified and neat inks G', G" and tan delta are typically used to identify molecular changes in the storage or loss modulus and the phase change between them.

Total body is assessed by first emulsifying 10 parts of distilled water or fountain solution in 100 parts of ink or resin solution by high-speed mixing using a DAK mixer at 3,000 rpm at room temperature for one minute. This amount is not restrictive and the same results may be obtained at any water level in the emulsified ink between 5% and the maximum the ink can take up, determined by a Duke water pick-up test.

Rheological measurements were carried out using a stress-controlled rheometer, model AR1000 from TA Instruments using a 2 cm 0.5° cone. These measurements allowed the determination of the specific ink structures that control rheology. The stress is ramped in the interval 0.01 to 10000 Pa and viscosity is recorded versus stress. Resulting from oscillation measurements, values for G' (elastic modulus), G" (viscous modulus), tan (delta.) (G"/G') and .eta.* (complex viscosity) were obtained by non-destructive measurements. We concentrated on the G' and G" values to determine a term called the "total body". A calculation of the total body which represents the sum of the squares of these values to the one-half power has been calculated and plotted for comparative evaluation of new polyesters synthesized.

$$\text{Total body} = [(G')^2 + (G'')^2]^{1/2}$$

These values were then compared against "real-life" measurements such as tack and misting to provide a correlation between theoretical parameters and press performance. Using this measurement technique, specific resins and varnishes were chosen to optimize the desired final ink properties by making iterative changes to the resin synthesis. The differences in rheological performance between neat and emulsified inks could be correlated to the same performance as the polyester resins. Low percent difference between the total body of neat resin and an emulsified resin translated to the finished ink, which equates to better tolerance for water and improved print performance in terms of improved print contrast and a wider water window.

Total body measurements, as illustrated in FIG. 2, describe the rheological behavior of a series of commercial polyesters compared to the inventive polyester. Specifically, the total body calculation, as described above, was employed. The comparative polyesters were produced from di-alcohol and di-acid monomers. By contrast, the synthesis of the inventive polymers described above are based upon di-epoxide and di-acid monomers. In this test, the polyester was run neat and then with 10% added water to determine the dropoff in total body with a water addition. The inventive polymer of Example 3 was significantly better than the Comparative examples.

In order to better understand the phenomenon of misting, and the rheological factors involved in its control, studies were undertaken to see how various resin properties and bodying additives affected the rheology and misting of UV/EB curable inks.

Screening Formulation Trials Comparing Misting and Rheological Performance

A further study was performed comparing misting and rheological performance (total body change) of three comparative commercial epoxy acrylates, e.g., Comparative Exs 1-3 in Table 2, specifically Ebecryl 3700, Ebecryl 871 and Ebecryl 657 (all from Cytec) versus inventive Example 3 in a pigment concentrate screening formulation. Specifically, Ebecryl 3700 is a Bisphenol-A epoxy acrylate (Bisphenol-A diglycidyl ether reacted with 2 moles of acrylic acid). Ebecryl 871 is a polyester acrylate (a polyester reacted with acrylic acid). Ebecryl 657 is a polyester tetra-acrylate (a pentaerythritol reaction with 4 moles of acrylic acid)

To simplify the comparison, cyan 15:3 pigment and EoT-MPTA was employed in all of the screening formulations. The inventors submit that any pigment or polymerizable monomer according to the present invention could have been employed. The data in provided in Table 3 below.

TABLE 3

| | Screening Formulations | | | |
|---|---|---|---|---|
| | Comp Ex. 1 (screening Formulation) | Comp Ex 2 (screening formulation) | Comp Ex. 3 (screening formulation) | Comp Ex. 4 (screening formulation) |
| Ebecryl 3700 | 50 | — | — | — |
| Ebecryl 871 | — | 50 | — | — |
| Ebecryl 657 | — | — | 50 | — |
| Polyester Example C | — | — | — | 50 |
| Ethoxylated TMPTA | 20 | 20 | 20 | 20 |
| Cyan 15.3 Pigment | 30 | 30 | 30 | 30 |
| Total | 100 | 100 | 100 | 100 |

All materials were mixed and subsequently passed over a 3-roll mill until an acceptable grind reading of at least 2/2/4 was obtained using a NPIRI G1 grind gauge.

All pigment grinds produced acceptable grind readings. However, the inventive polyester exhibited better misting performance compared to comparative examples 1-3 employing conventional oligomers. These values are provided in Tables 1 and 2 above. The total body rheological values before and after emulsification with 10% water also are provided for Comparative Examples 1-4 and Inventive Example 3 in Tables 1 and 2 above. The inks of the present invention are assessed before emulsification, i.e., neat.

Tables 1 and 2 show the improvement in misting and greatly reduced % change in body. Inventive Ink Example 3 changes the least in total body of the ink neat vs. emulsified. This is important because if emulsified lithographic inks have the same body as neat inks, their flow behavior on-press would be similar. Accordingly, there is better tolerance for water in the ink and improved print performance as measured by improved print contrast and a wider water window. The present invention exhibits significantly improved lithographic ink performance wherein the ink body properties do not change much when emulsified with water when on press.

Water Window

Additionally, the inks of the present invention were tested for water up-take. As shown below in Tables 5 and 6, Inventive ink Examples 3 and 4 exhibit a high water up-take (WUT). Water up-take represents the capacity of the given ink determined by mixing together 100 g of ink with 100 nil of water or fountain solution until no more water is emulsified by the ink. The percent of water (volume by weight) incorporated into the ink is recorded as a WUT percentage.

According to the present invention, inks having the optimal lithographic press performance properties described above exhibit a water window of at least 10%.

Water window values of the inventive inks are determined on a two color sheet-fed Miehle press by first supplying the minimum amount of water (fountain solution) required to clean up a non-image area of the lithographic plate and achieve target print density (typically 1.00 for yellow, 1.35 for red, 1.4 for blue and 1.65 for black). The procedure of obtaining the target print density is an iterative process performed by the press operator. As a final measure, the press operator confirms no colors are present on "non-image" areas of the lithographic plate. Once the print density is confirmed, water gradually is supplied by opening water control keys, or water notches, in the fountain solution unit. After completion of each incremental increase in water supply, about 200 sheets are printed and measured for print density. This increase in water supply continues until print density drops by at least 0.1. The spread between initial and final water key settings represents the water window, i.e., WUT, or the range of water tolerance of the tested ink.

Print Contrast

Print contrast is determined using a calculation that compares the density readings of a three-quarter tone area (75%) to the density of a solid area (100%) of the same process color. Good print contrast indicates a printing system's ability to hold open the shadow areas while maintaining high ink densities. Tables 5 and 6 show print contrast characteristics of inventive ink examples 3 and 4.

Print Density

Print density was measured using an X-rite spectrophotometer. While it is understood that ink density typically drops as additional water is supplied (represented by an increase in water notches), it is advantageous to maintain the ink density as high as possible. A drop of about 0.1 from the initial density is considered significant and is typically the point where prints will no longer be of commercially acceptable quality, though for some applications, a density drop of greater than 0.1 may be acceptable. Tables 5 and 6 show print density characteristics of inventive ink examples 3 and 4.

A Miehle press trial was run to determine the water window and print contrast for a comparative ink versus an ink containing inventive polyester. Rycoline 4600 Printeasy fountain solution was used.

TABLE 4

Press trial results of Comparative Example 4

| Water Notches | Print Density | Print Contrast |
| --- | --- | --- |
| 78 | 1.31 | 23 |
| 80 | 1.25 | 21 |
| 82 | 1.29 | 18 |
| 84 | 1.26 | 16 |
| 86 | 1.25 | 19 |
| 88 | 1.23 | 18 |
| *90 | 1.19 | 16 |

Comparative Example 4 required 78 notches of water to run properly at the onset of the test (Table 4). The water was increased 2 notches at a time and the ink density on paper was measured. When 90 notches of water were used, the ink became over-emulsified and the printed ink density became mottled and significantly lower in density. This is the point where the ink has "broken". Below this point encompasses the useful operating water window. The spread between initial and final water key settings represents water window or the range of water tolerance of the tested ink. The water window of Comparative Example 4 broke at 90 as indicated by the asterisk in Table 4. Therefore the water window percentage is 12.8%. In addition, the difference in print density between 78 and 88 notches is 0.08.

TABLE 5

Press results of Example 3 ink formulation

| Water Notches | Print Density | Print Contrast |
| --- | --- | --- |
| 70 | 1.99 | 31 |
| 72 | 1.33 | 27 |
| 74 | 1.29 | 29 |
| 76 | 1.31 | 26 |
| 78 | 1.27 | 25 |
| 80 | 1.32 | 24 |
| 82 | 1.33 | 25 |
| 84 | 1.29 | 27 |
| 86 | 1.30 | 27 |
| 88 | 1.27 | 24 |
| 90 | 1.25 | 25 |
| 92 | 1.28 | 24 |
| 94 | 1.27 | 24 |

TABLE 6

Press results of Example 4 ink formulation

| Water Notches | Print Density | Print Contrast |
| --- | --- | --- |
| 46 | 1.37 | 29 |
| 48 | 1.38 | 35 |
| 50 | 1.40 | 30 |
| 52 | 1.39 | 31 |
| 54 | 1.38 | 35 |
| 50 | 1.40 | 30 |
| 52 | 1.39 | 31 |
| 54 | 1.38 | 31 |
| 56 | 1.36 | 27 |
| 58 | 1.37 | 31 |
| 60 | 1.35 | 26 |
| 62 | 1.36 | 28 |
| 64 | 1.32 | 30 |
| 66 | 1.33 | 26 |
| 68 | 1.30 | 24 |
| 70 | 1.29 | 22 |
| 72 | 1.31 | 18 |
| 74 | 1.30 | 19 |
| 76* | — | — |

The increased water window of Inventive Examples 3 and 4 are illustrated in Tables 5 and 6 above. Both Inventive Examples 3 and 4 demonstrate improved operating water window values of about 34 and 60%, respectively. Both inks continued to print with an acceptable density less than about 8% print density loss at the limit of the test. Ideally, there would be no loss in printed ink density as a function of the water used. In reality, a printed density loss of less than 8% compared to the initial density measurement is regarded as acceptable.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A polyester resin having a substantially linear structure and a number average molecular weight less than about 20,000, said polyester resin comprising: a di-epoxide monomer; and a di-acid monomer; wherein the polyester resin has an acid value less than 1.0; and wherein the polyester resin contains reactive epoxy end groups.

2. The polyester resin according to claim 1, wherein the stoichiometric ratio of the diepoxide monomer to the di-acid monomer ranges from about 1:0.30 to 1.0:0.99.

3. The polyester resin according to claim 2, wherein the stoichiometric ratio ranges from about 1.0:0.35 to 1.0:0.80.

4. The polyester resin ratio according to claim 3, wherein the stoichiometric ratio from about 1.0:0.42 to 1.0:0.65.

5. The polyester resin according to claim 1, wherein the molecular weight ranges from about 5,000 to 10,000.

6. The polyester resin according to claim 5, wherein the molecular weight ranges from about 6,000 to 8,000.

7. The polyester resin according to claim 1, wherein the diepoxide monomer is selected from the group consisting of: bisphenol-A diglycidyl ether or its ethoxylated analogues, cycloaliphatic epoxies, cycloaromatic epoxies, hydrogenated bisphenol-A diglycidyl ether or its ethoxylated analogues and mixtures thereof.

8. The polyester resin according to claim 1, wherein the di-acid monomer is selected from the group consisting of: isophthalic acid, sebacic acid, fumaric acid, maleic acid, adipic acid, nitroisophthalic acid, terephthalic acid, undecanoic acid, succinic acid, glutaric acid, pimelic acid, azelaic acid, malonic acid, suberic acid and mixtures thereof.

9. The polyester resin according to claim 1, wherein the polyester resin is free of acrylates.

10. The polyester resin according to claim 1, wherein the polyester resin comprises two pendant hydroxyl groups per repeat unit.

11. The polyester resin according to claim 1, wherein the acid value is less than 0.5.

12. The polyester resin according to claim 11, wherein the acid value is less than 0.25.

13. The polyester resin according to claim 1, further comprising a free radical inhibitor.

14. The polyester resin according to claim 13, wherein the free radical inhibitor is selected from the group consisting of: hydroquinone, methyl hydroquinone, monomethyl ether of hydroquinone, tert-butyl hydroquinone, di-tert-butyl hydroquinone, 2,6-di-tert-butyl-4-methylphenol, phenothiazin, triphenyl antimony, oxalic acid and mixtures thereof.

15. A method of preparing the polyester resin according to claim 1, comprising reacting the di-epoxide monomer with the di-acid monomer.

16. An energy curable lithographic printing ink or coating comprising the polyester resin according to claim 1.

17. The energy curable lithographic printing ink according to claim 16, wherein the polyester resin is about 15-35 wt. % of the energy curable lithographic ink.

18. The energy curable lithographic printing ink according to claim 17, wherein the polyester resin is about 18-32 wt. % of the ink.

19. The energy curable lithographic printing ink according to claim 16, exhibiting a total body change less than about 40%.

20. The energy curable lithographic printing ink according to claim 19, wherein the total body change is less than about 15%.

21. The energy curable lithographic printing ink according to claim 20, wherein the total body change is less than about 3%.

22. The energy curable lithographic printing ink according to claim 16, exhibiting a water window greater than about 15%.

23. The energy curable lithographic printing ink according to claim 22, wherein the water window is greater than about 30%.

24. The energy curable lithographic printing ink according to claim 16, wherein the print density is less than about 8%.

25. The energy curable lithographic printing ink according to claim 16, further comprising a polymerizable multifunctional monomer.

26. The energy curable lithographic printing ink according to claim 25, wherein said polymerizable multifunctional monomer is less than about 35 wt % of the ink.

27. The energy curable lithographic printing ink according to claim 26, wherein the polymerizable multifunctional monomer is less than about 25 wt. % of the ink.

28. The energy curable lithographic printing ink according to claim 16, further comprising a radiation curable oligomer and/or polymer.

29. The energy curable lithographic printing ink according to claim 28, wherein said radiation curable oligomer and/or polymer is selected from the group consisting of: (meth)acrylated urethanes, (meth)acrylated epoxies, (meth)acrylated polyesters, (meth)acrylated (meth) acrylics, (meth)acrylated silicones, (meth)acrylated polyethers, vinyl(meth)acrylates, (meth)acrylated oils and mixtures thereof.

30. The energy curable lithographic printing ink according to claim 16, further comprising a photoinitiator.

31. A method of making the energy curable lithographic printing ink according to claim 16, comprising: providing a polyester resin; and mixing the polyester resin with a solvent.

32. A printed article comprising the energy curable lithographic ink according to claim 16.

33. Use of the energy curable lithographic ink according to claim 16 for printing on a substrate.

* * * * *